United States Patent
Kamasuka

(10) Patent No.: US 8,665,456 B2
(45) Date of Patent: Mar. 4, 2014

(54) IMAGE PROCESSING APPARATUS, METHOD FOR CONTROLLING THE SAME, AND COMPUTER-READABLE STORAGE MEDIUM STORING COMPUTER PROGRAM FOR SELECTING A TRANSMISSION DESTINATION TO WHICH READ DATA IS TO BE TRANSMITTED

(75) Inventor: Atsushi Kamasuka, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 620 days.

(21) Appl. No.: 12/638,935

(22) Filed: Dec. 15, 2009

(65) Prior Publication Data

US 2010/0149577 A1 Jun. 17, 2010

(30) Foreign Application Priority Data

Dec. 17, 2008 (JP) ................................ 2008-321634

(51) Int. Cl.
*G06F 15/00* (2006.01)

(52) U.S. Cl.
USPC ........................................ 358/1.13; 358/1.15

(58) Field of Classification Search
USPC .............................................. 358/1.13, 1.15
See application file for complete search history.

(56) References Cited

U.S. PATENT DOCUMENTS

| | | |
|---|---|---|
| 2001/0014908 A1 | 8/2001 | Lo et al. |
| 2004/0261084 A1 | 12/2004 | Rosenbloom et al. |
| 2005/0080844 A1 | 4/2005 | Dathathraya et al. |
| 2006/0077459 A1 | 4/2006 | Matsueda et al. |
| 2006/0206923 A1* | 9/2006 | Thompson ........................ 726/4 |
| 2006/0271675 A1* | 11/2006 | Wakazono et al. ........... 709/224 |
| 2007/0183448 A1 | 8/2007 | Ochiai |
| 2007/0206216 A1* | 9/2007 | Sakagami et al. ........... 358/1.15 |

FOREIGN PATENT DOCUMENTS

| | | |
|---|---|---|
| EP | 1422920 A2 | 5/2004 |
| EP | 1631054 A1 | 3/2006 |
| JP | 10-111793 A | 4/1998 |
| JP | 2006-339904 A | 12/2006 |

OTHER PUBLICATIONS

Machine translation for JP10-111793, IDS.*

* cited by examiner

*Primary Examiner* — Qian Yang
(74) *Attorney, Agent, or Firm* — Canon USA, Inc., IP Division

(57) ABSTRACT

An image processing apparatus including a selecting unit adapted to select an information processing apparatus displayed by a displaying unit, and a transmitting unit adapted to transmit data generated when the reading unit reads an original document in accordance with a reading setting specified by the selected information processing apparatus in accordance with identification information included in notification information transmitted from the information processing apparatus.

14 Claims, 12 Drawing Sheets

| ITEM | CONTENT |
|---|---|
| NAME | CLIENT PC 103 |
| ID | A123456 |
| BUTTON NAME 1 | SCAN 1 |
| COMMENT 1 | COLOR, A4 |
| BUTTON NAME 2 | SCAN 2 |
| COMMENT 2 | COLOR, A3 |
| BUTTON NAME 3 | SCAN 3 |
| COMMENT 3 | BLACK AND WHITE, A3 |
| BUTTON NAME 4 | SCAN 4 |
| COMMENT 4 | BLACK AND WHITE, A4 |

FIG. 12

LIST OF SCAN SETTINGS:

Scan1
Scan2
Scan3
Scan4

FIG. 13

LIST OF CLIENTS:

EFFECTIVE CLIENT
IS NOT FOUND.
CHECK THE SETTING.

IMAGE PROCESSING APPARATUS, METHOD FOR CONTROLLING THE SAME, AND COMPUTER-READABLE STORAGE MEDIUM STORING COMPUTER PROGRAM FOR SELECTING A TRANSMISSION DESTINATION TO WHICH READ DATA IS TO BE TRANSMITTED

BACKGROUND OF THE INVENTION

1. Field of the Invention

The present invention relates to an image processing apparatus including a reading unit which is capable of communicating with an information processing apparatus and which reads an original document, a method for controlling the image processing apparatus, and a computer-readable storage medium storing a computer program.

2. Description of the Related Art

In a case where a document is scanned by an image processing apparatus including a scanner device in a network environment and the image processing apparatus is controlled by a client computer, a driver which operates in the client computer is generally used. That is, a user who operates the client computer transmits an instruction to the image processing apparatus so that scanning is performed using the scanner driver and obtains image data read through the scanning. This processing method is generally referred to as "Pull Scan processing".

On the other hand, a method for reading image data by scanning a document, by a user operating an image processing apparatus, and transmitting the image data to a client computer has been generally known. This processing method is referred to as "Push Scan processing".

Furthermore, as a modification of the Push Scan processing, a method for activating a driver which operates in a client computer by transmitting an instruction from an image processing apparatus and executing the Pull Scan processing has been proposed (refer to Japanese Patent Laid-Open No. 10-111793, for example). This processing method is referred to as "pseudo Push Scan processing".

When Push Scan processing or pseudo Push Scan processing is performed, a user selects a client computer to which image data is to be transmitted using an operating panel of the image processing apparatus. Therefore, the image processing apparatus capable of performing the Push Scan processing or the pseudo Push Scan processing is required to store information on one or a plurality of client computers.

In an effort to improve usability, a client computer which is not currently operating is required to be a transmission destination of the image data. As a method for realizing such control, a method for periodically transmitting notifications from client computers to an image processing apparatus has been proposed. Accordingly, the image processing apparatus can recognize operation states of the client computers in accordance with states of receptions of the periodical notifications supplied from the client computers. On the other hand, since the image processing apparatus replies on an operation state of itself to the client computers in response to the notifications supplied from the client computers, the client computers can recognize the operation state of the image processing apparatus.

It should be noted that a frequency of notifications transmitted from the client computers to the image processing apparatus and the number of client computers should be taken into consideration. For example, in a case where a notification is transmitted from a client computer to the image processing apparatus every five seconds, twelve notifications are transmitted in one minute. Accordingly, the image processing apparatus replies twelve responses per minute. Assuming that five client computers transmit notifications to the image processing apparatus with this frequency, the image processing apparatus is required to reply 60 responses per one minute.

In recent years, in order to reduce cost of image processing apparatuses, there has been a demand for reduction of capacities of memories included in the image processing apparatuses. Therefore, a number of image processing apparatuses do not include mass storage devices. In addition, it is also desirable to reduce unnecessary processing load applied to image processing apparatuses.

Accordingly, in order to reduce the processing load to such an image processing apparatus as described above, the number of client computers which are managed by a single image processing apparatus is limited.

When the number of client computers which are managed by an image processing apparatus is limited under the circumstance described above, the following method can be proposed.

That is, a method for successively registering client computers which transmit operation states in an image processing apparatus and terminating the registration when the maximum number is reached. In this case, client computers which transmit operation states after the maximum number is reached are not registered in the image processing apparatus and the image processing apparatus does not transmit responses to unregistered client computers.

However, in a case where a limited number of client computers are managed by an image processing apparatus using this method, when a user selects a transmission destination to which image data is to be transmitted using an operating panel of the image processing apparatus, a client computer desired by the user may not be displayed. This is because it is possible that the client computer desired by the user is not included in the limited number of client computers to be managed.

On the other hand, in a case where the maximum number of client computers is not set, if a considerably large number of client computers are displayed in the operation panel of the image processing apparatus, it is difficult for the user to locate and select a desired client computer. Furthermore, the likelihood that a user selects an unintended client computer is increased.

SUMMARY OF THE INVENTION

According to the present invention, when a user operates an image processing apparatus so as to select a transmission destination to which read data is to be transmitted, the transmission destination desired by the user is reliably selected.

According to an embodiment of the present invention, an image processing apparatus is provided including: a reading unit adapted to read an original document; a receiving unit adapted to receive specifying information used to specify a reading setting employed when the original document is read by the reading unit and notification information including identification information from an information processing apparatus; an obtaining unit adapted to obtain identification information input by a user; a registering unit adapted to register, when the notification information received by the receiving unit includes identification information corresponding to the identification information obtained by the obtaining unit, the information processing apparatus which transmitted the notification information as a display object.

A displaying unit adapted to display an identification of the information processing apparatus which serves as the display object and which is registered by the registering unit; a selecting unit adapted to select an information processing apparatus displayed by the displaying unit; and a transmitting unit adapted to transmit data generated when the reading unit reads the original document in accordance with the reading setting specified by the selected information processing apparatus in accordance with the identification information included in the notification information transmitted from the information processing apparatus.

Further features of the present invention will become apparent from the following description of exemplary embodiments with reference to the attached drawings.

BRIEF DESCRIPTION OF THE DRAWINGS

FIG. 12 is a diagram illustrating an example of a screen displayed in the display unit of the MFP according to the embodiment of the present invention.

FIG. 13 is a diagram illustrating an example of a screen displayed in the display unit of the MFP according to the embodiment of the present invention.

DESCRIPTION OF THE EMBODIMENTS

Apparatuses according to the present invention and operations thereof will be described in detail. Components described in the embodiments below are examples and the present invention is not limited to these.

First Embodiment

Figure 1:
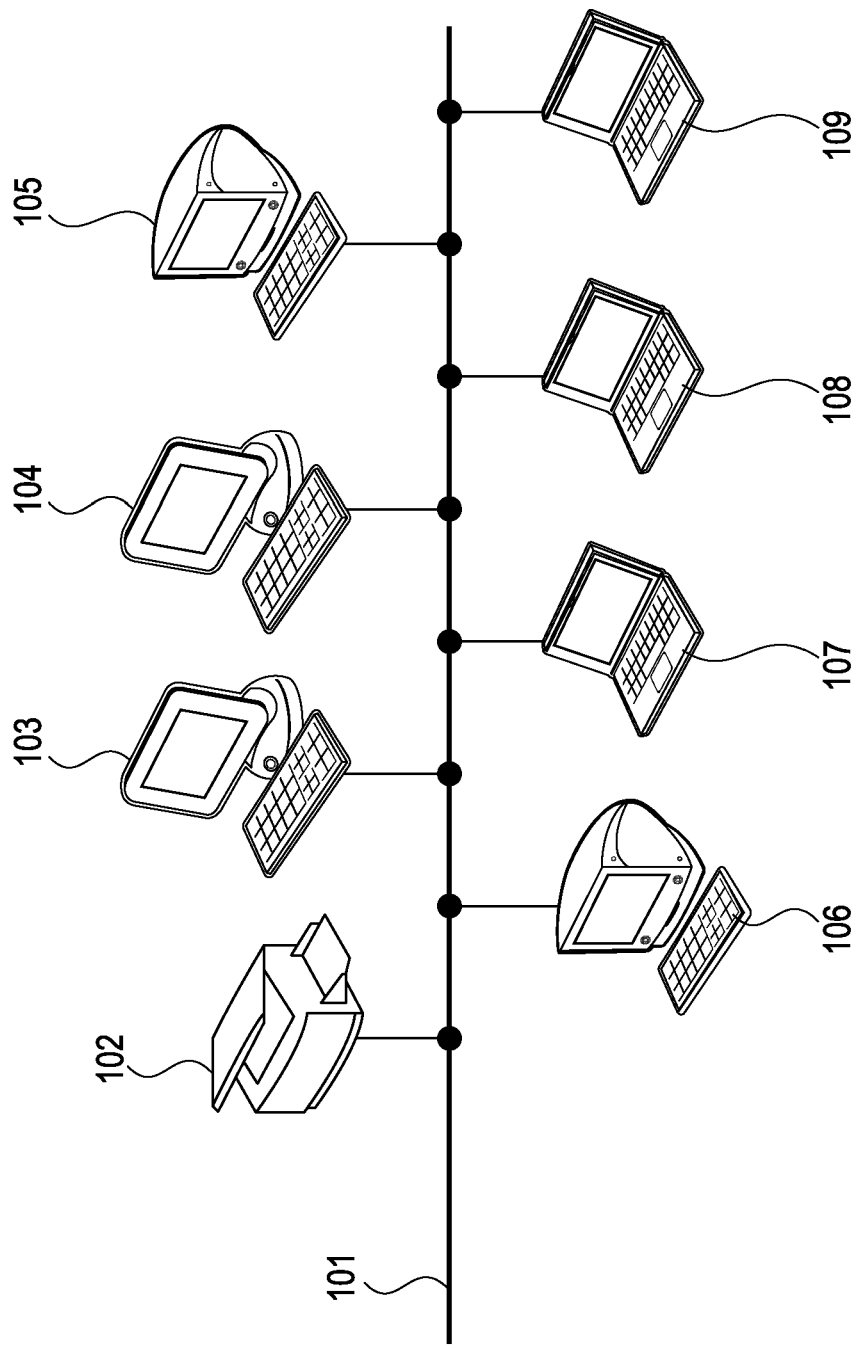
FIG. 1 is a diagram illustrating a configuration of an entire system including client PCs and an MFP according to an embodiment of the present invention.

FIG. 1 is a diagram illustrating a configuration of an image processing system according to a first embodiment of the present invention.

In FIG. 1, a network 101 connects a plurality of apparatuses, which will be described below, to one another. Network 101 uses Ethernet and a TCP/IP protocol. Network 101 may be replaced by another network, for example, a wireless network. An MFP (Multi Function Peripheral) 102 serves as an example of an image processing apparatus including a scanner device. Client personal computers (PCs) 103 to 109 are examples of information processing apparatuses capable of communicating with the MFP 102. Each of the client PCs 103 to 109 can receive a request for executing processing supplied from the MFP 102 operated by a user. Conversely, each of the client PCs 103 to 109 can be operated by the user so as to transmit a request for executing setting or processing to the MFP 102.

Figure 2:
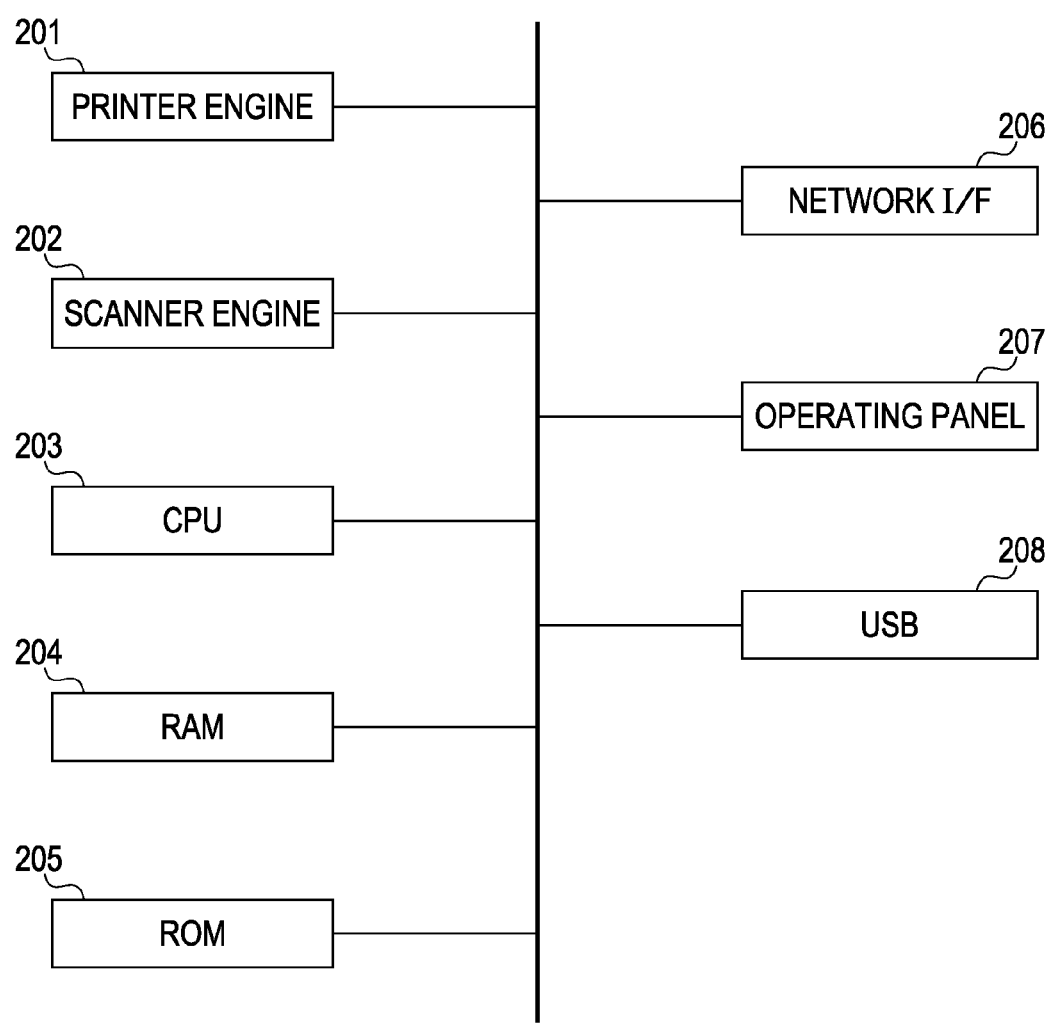
FIG. 2 is a block diagram illustrating the MFP according to the embodiment of the present invention.

FIG. 2 is a block diagram illustrating a hardware configuration of the MFP 102. In FIG. 2, a printer engine 201 employs a known printing technique such as an electrophotography method and an inkjet method. A scanner engine 202 reads an original document utilizing an optical reading technique so as to generate image data. A central processing unit (CPU) 203 controls the operation of the MFP 102. A ROM (Read Only Memory) 205 serves as a storage unit which stores an operation control program to be executed by CPU 203 and various data. A network interface (I/F) 206 is used for connection to the network 101 and enables connection to apparatuses included in the network 101 such as client PCs through the network 101. An operating panel 207 includes user interfaces and is constituted by a display unit including liquid crystal and LEDs (Light Emitting Diodes) and a plurality of operating buttons. A RAM (Random Access Memory) 204 serves as a storage unit which temporarily stores image data to be printed by the printer engine 201 and image data to be transmitted or received through the network interface 206. A USB port 208 is used to access a USB (Universal Serial Bus) external device such as a USB memory.

Figure 3:
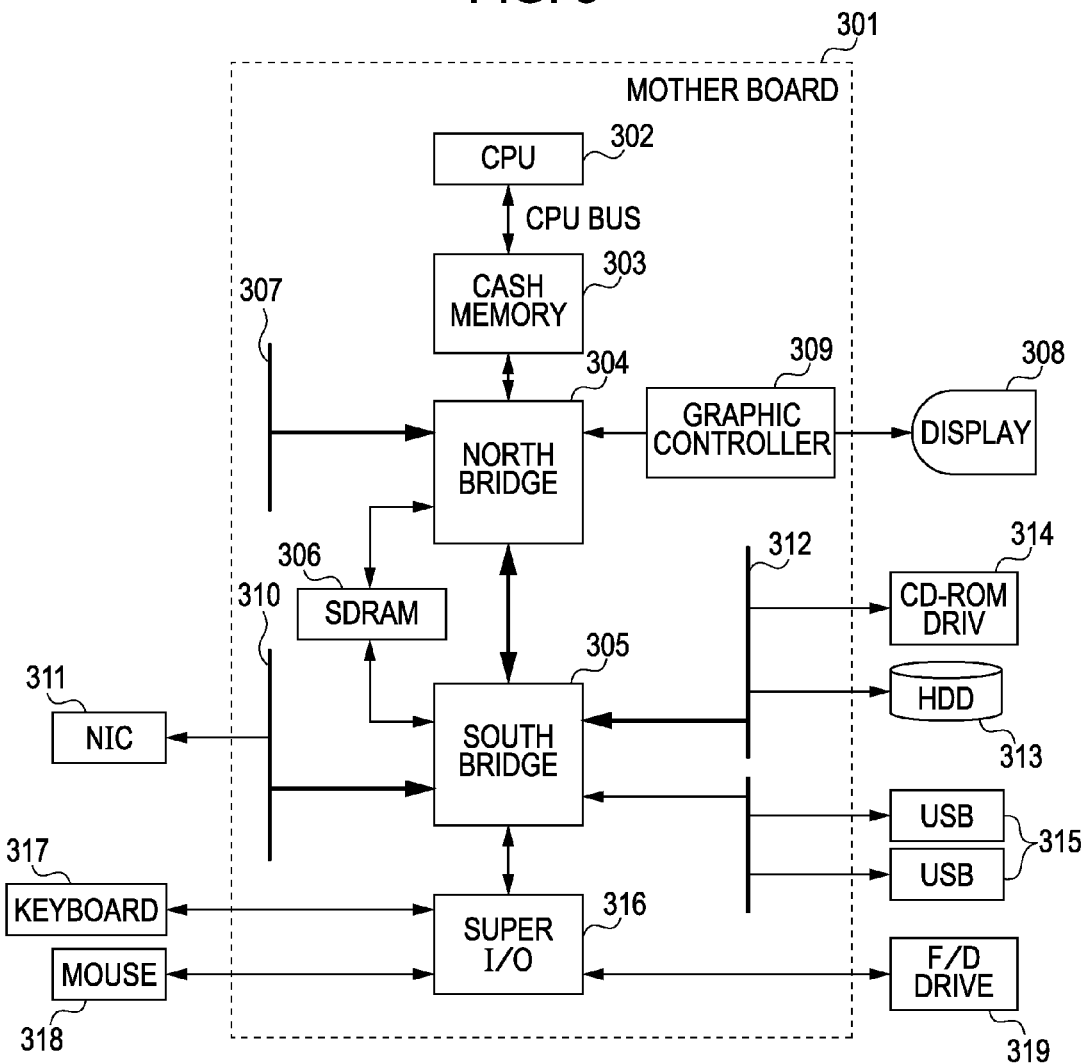
FIG. 3 is a block diagram schematically illustrating a configuration of one of the client PCs according to the embodiment of the present invention.

FIG. 3 is a block diagram schematically illustrating a hardware configuration of one of the client PCs 103 to 109. Hereinafter, description will be made taking the client PC 103 as an example. As the hardware configuration of the client PC 103, various configurations which employ various connection methods, various buses, and various interfaces have been generally known, and the hardware configuration of FIG. 3 is merely an example.

Referring to FIG. 3, in a mother board 301 denoted by a dashed line, a CPU 302 communicates with a north bridge 304 and a south bridge 305 through a cash memory 303 and controls entire software of the client PC 103. Note that a memory (SDRAM 306) is used to transmit and receive data between the north bridge 304 and the south bridge 305 and to temporarily store data in the client PC 103. The north bridge 304 has a universal PCI (Peripheral Component Interconnect) (32 bits/33 MHz) bus 307 used when a SCSI external device is additionally connected (later). The north bridge 304 is also connected to a graphic controller 309 which is used to perform display using a display 308. Furthermore, the south bridge 305 has another universal PCI bus 310 which is used to perform network connection through an NIC (Network Interface Card) 311. The south bridge 305 further has an IDE (Integrated Drive Electronics) bus 312 to which a hard disk drive (HDD) 313 which stores various data including control software of the client PC 103 is connected. Furthermore, a CD-ROM (or CD-R or CD-RW) drive 314 which is used to read data and store a large amount of data (archive) when the client PC 103 performs installation is connected to the south bridge 305 through the IDE bus 312. A USB port 315 enables an access to a USB external device such as a USB memory. Input and output of data can be performed through a super I/O unit 316 which is connected to a keyboard 317, a mouse 318, and a floppy (registered trademark) disk drive (F/D drive) 319.

Figure 4:
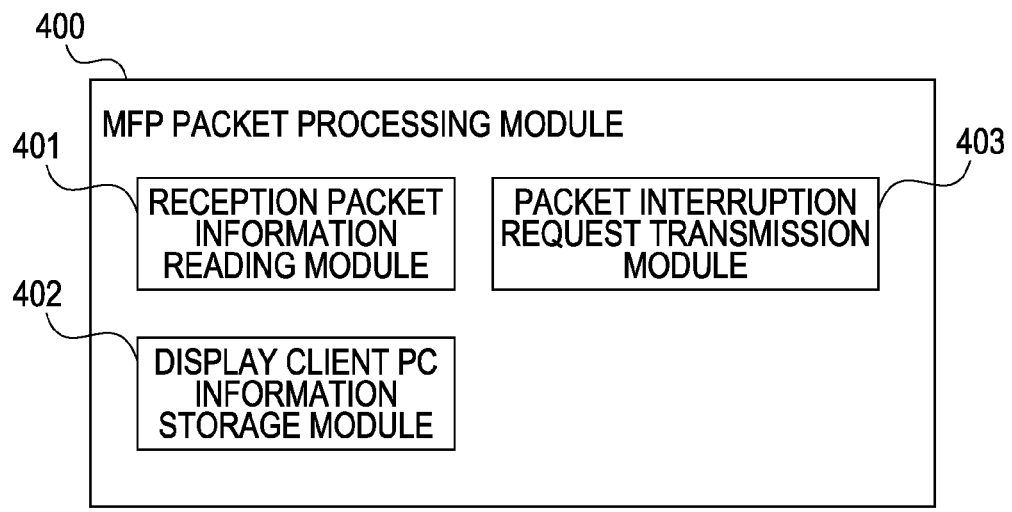
FIG. 4 is a diagram schematically illustrating a packet processing module of the MFP according to the embodiment of the present invention.

FIG. 4 is a diagram schematically illustrating a packet processing module 400 which is one of software modules to be executed by the CPU 203 of the MFP 102. Referring to FIG. 4, the packet processing module 400 will be described in detail.

A reception packet information reading module 401 performs processing for reading content of a packet (notification information transmitted using a packet transmission module 502 which will be described hereinafter) which is supplied from one of the client PCs 103 to 109 and which is received using the network interface 206.

A display client PC information storage module 402 performs processing for storing the content of the packet read by executing the reception packet information reading module 401 in a storage unit such as the RAM 204 or the ROM 205. The number of information items regarding client PCs which can be stored by executing the display client PC information storage module 402 is limited, and in this embodiment, it is assumed that five information items are stored. Note that after the number of information items regarding client PCs which can be stored by executing the display client PC information storage module 402 reached an upper limit, only detailed information items of packets corresponding to the stored information items regarding client PCs can be read by executing the reception packet information reading module 401, and packets transmitted from other client PCs are ignored. The upper limit of the number of information items regarding client PCs which can be stored using the display client PC information storage module 402 is determined so as not to affect main processing of the MFP 102 taking load applied to the MFP 102 into consideration. The upper limit may be changed by an administrator and the like.

A packet interruption request transmission module 403 generates a request for interrupting transmission of a packet and transmits the request to a driver application of the client PC which will be described hereinafter.

Figure 5:
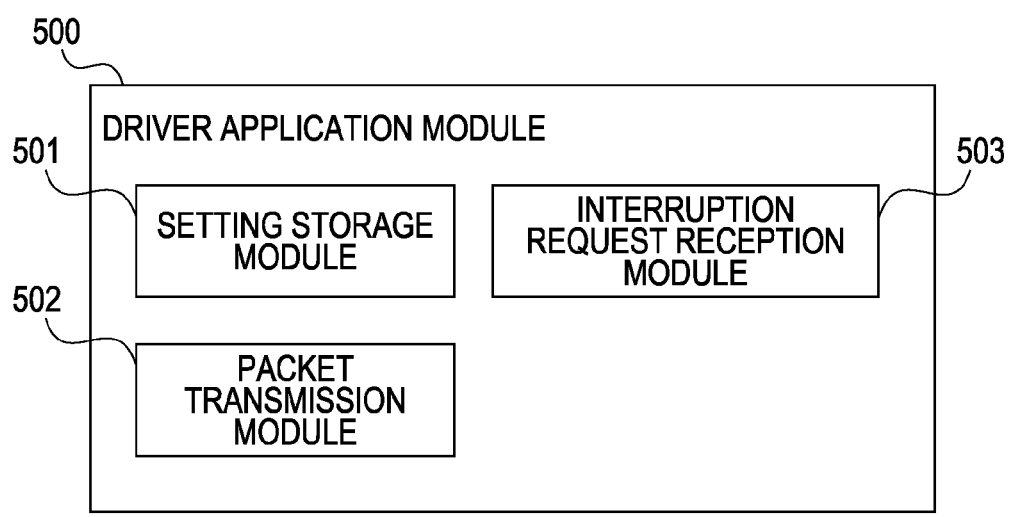
FIG. 5 is a diagram schematically illustrating a driver application module of the client PC according to the embodiment of the present invention.

FIG. 5 is a diagram schematically illustrating a driver application module 500 which is installed in the client PC and which is used to remotely operate and set the MFP 102. Referring to FIG. 5, the driver application module 500 will be described in detail.

A setting storage module 501 performs processing for storing setting of Pull Scan processing set by a user using a driver application in a memory included in the client PC.

A packet transmission module 502 performs processing for periodically transmitting information on the client PC (identification information used to identify the client PC) or notification information including the setting information regarding the Pull Scan processing to the MFP 102 as a packet.

An interruption request reception module 503 receives a request for interrupting a packet transmission issued from the MFP 102 and instructs the packet transmission module 502 to stop the packet transmission for a predetermined period of time. Furthermore, the interruption request reception module 503 measures time and instructs the packet transmission module 502 to restart the packet transmission after the predetermined period of time has passed.

Figures 6, 7:
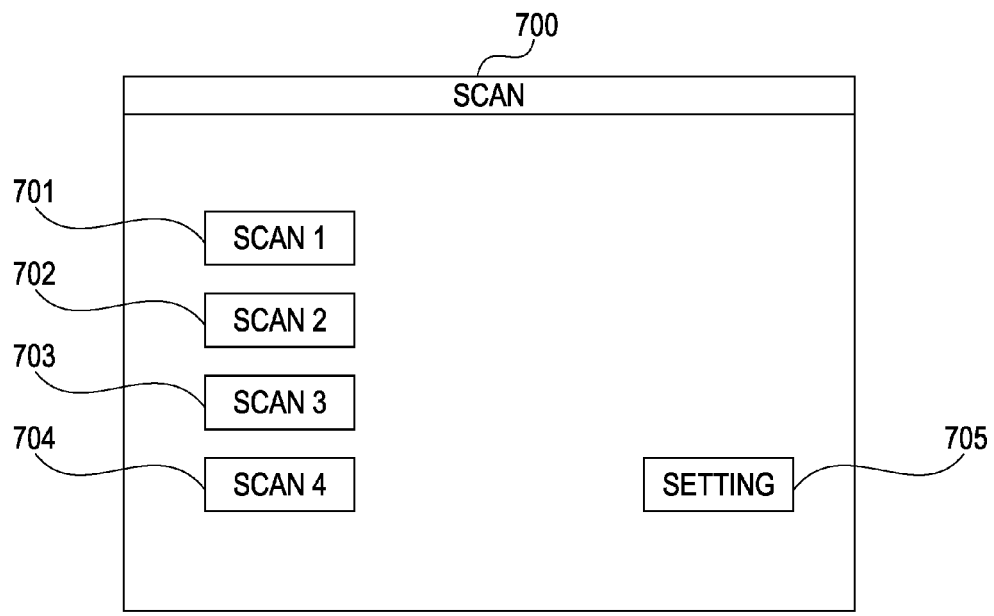
FIG. 6 is a diagram illustrating an example of notification information transmitted using the driver application module according to the embodiment of the present invention.
FIG. 7 is a diagram illustrating an example of a display screen displayed in the client PC according to the embodiment of the present invention.

FIG. 6 is a diagram illustrating a detailed example of the notification information transmitted by executing the packet transmission module 502 included in the driver application module 500 to the MFP 102. In this embodiment, the notification information includes "name" representing a name of the client PC (a name of a host computer in the network), "ID" representing identification information of the user, "button name" representing a name of a button used to select scanning setting, and "comment" representing brief information on the scanning setting. The scanning setting corresponds to reading setting such as setting of a size and a resolution, for example, when an original document is read by a scanner. In this embodiment, the reading setting including a plurality of items may be registered so as to correspond to a single button. The reading setting will be described in detail hereinafter with reference to FIG. 8. Note that the notification information transmitted using the packet transmission module 502 to the MFP 102 may include other information. For example, the notification information further includes address information used to identify a client PC in the network.

FIG. 7 is a diagram illustrating an example of a screen 700 of the driver application module 500 displayed in the display 308 of any one of the client PCs 103 to 109. Specifically, the screen 700 is displayed in the display 308 of the client PC when the client PC instructs execution of the Pull Scanning processing, for example. It is assumed that custom scanning settings which are different settings of reading processing are assigned to buttons 701 to 704. In this embodiment, the driver application module 500 registers four custom scanning settings. When one of the buttons 701 to 704 is pressed, the client PC transmits a scanning instruction and information on a scanning setting to the MFP 102. Then, the MFP 102 starts reading of an original document, performs appropriate processing in accordance with the received setting information, and transmits image data to the client PC.

Figure 8:
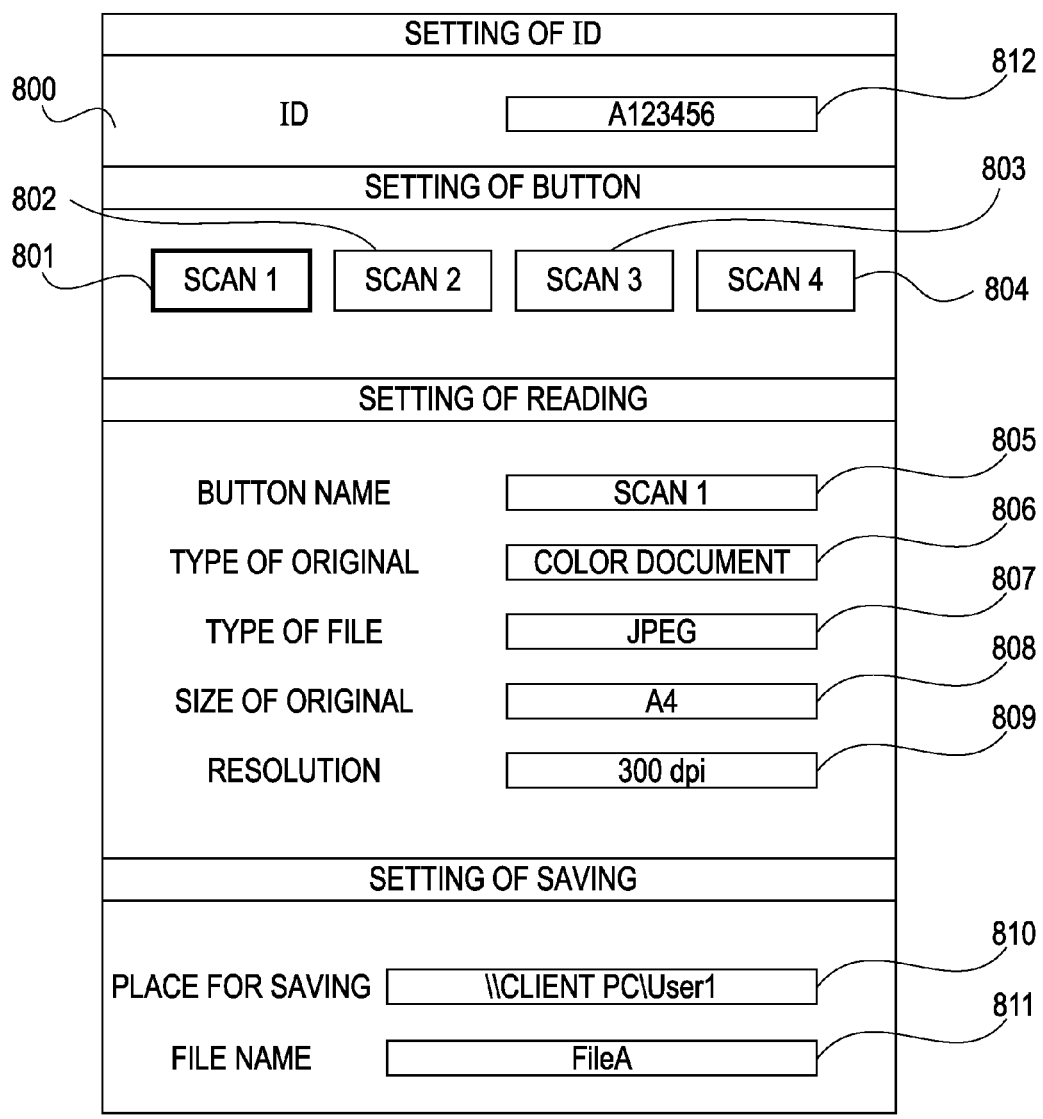
FIG. 8 is a diagram illustrating an example of a display screen displayed in the client PC according to the embodiment of the present invention.

The custom scanning settings which can be assigned to the buttons 701 to 704 will be described in detail with reference to FIG. 8. When a "setting" key 705 shown in FIG. 7 displayed in the screen 700 is pressed, a screen 800 shown in FIG. 8 is displayed in the display 308. In a field 812, an ID (a user ID or a section ID, for example) is specified as identification information used to identify a user who instructed a scanning setting. In the screen 800 shown in FIG. 8, when one of buttons 801 to 804 is pressed, a corresponding custom setting is selected. For example, when the user presses the button 801, a custom setting corresponding to a "scan 1" key is performed. By performing this selection operation, setting values previously input by the user are displayed in fields 805 to 811 (if the user has not input any setting values, default values are displayed). The user can arbitrarily change these values. For example, a name of a custom scan key can be changed in the field 805. When a name of the button is changed in the field 805, the changed button name is displayed in a screen of the MFP 102 which will be described hereinafter.

In the field 806, color scanning or monochrome scanning is selected for reading of an original document so that a color document or a monochrome document is obtained. In the field 807, a file format of image data to be generated can be selected from among a JPEG format, a TIFF format, a PDF format, a BMP format, and the like. In the field 808, a size of the original to be scanned is specified. In the field 809, a resolution of an image to be scanned is selected. In the field 810, a location (path) in which an image is to be stored is specified. In an example of FIG. 8, a directory "user 1" of the client PC is specified. In the field 811, a name of a storage file is specified.

As described above, image processing is performed on scanned image data in accordance with the setting values in the fields 806 to 809 so that desired image data is obtained. The image processing may be performed by any one of the MFP 102 and the client PCs 103 to 109. Furthermore, although the same identification information in the field 812 is assigned to the scanning settings in the buttons 801 to 804 in this embodiment, different identification information items may be assigned to different scanning settings.

Figure 9:
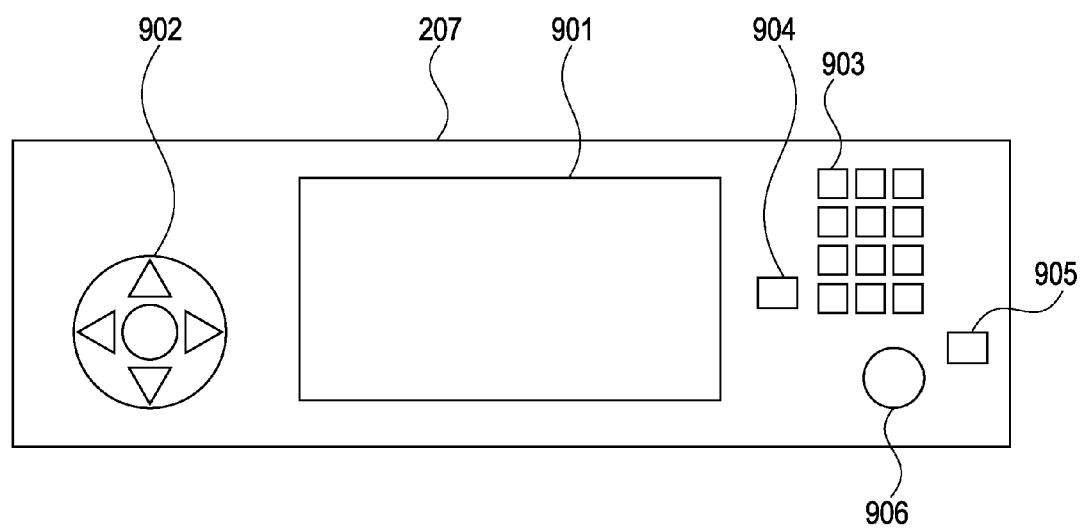
FIG. 9 is a diagram illustrating a configuration of an operating panel of the MFP according to the embodiment of the present invention.

FIG. 9 is a diagram illustrating a configuration of the operating panel 207 of the MFP 102 in detail. The operating panel 207 includes an LCD 901, a menu selection key 902, a numeric keypad 903, a resetting key 904, a stop key 905, and a start key 906. In this embodiment, the menu selection key 902 to the start key 906 are hard keys. The menu selection key 902 includes keys used for scrolling to select an item from menu displayed in the LCD 901 and a key used to determine the selected item. The numeric keypad 903 is used to directly input a value representing the number of documents to be printed, for example. The resetting key 904 is used to clear a state of setting which is being set so as to reset to initial values. The start key 906 is used to give an instruction for starting of various jobs. The stop key 905 is used to give an instruction for stop of the started jobs. A concrete example of a screen displayed in the LCD 901 will be described hereinafter with reference to FIGS. 10 to 13.

Next, a system in which information representing a client PC serving as a transmission destination of image data scanned by the MFP 102 is displayed in the operating panel 207 included in the MFP 102 will be described.

The packet transmission module 502 included in the driver application module 500 in each of client PCs 103 to 109 included in the network 101 transmits the notification information described above to the MFP 102. When receiving the notification information, the MFP 102 recognizes the client PCs 103 to 109 and displays a list of the client PCs 103 to 109 (a client PC list) in the LCD 901 included in the operating panel 207. Note that information on "name" of the client PCs 103 to 109 among the concrete examples of the notification information shown in FIG. 6 is displayed. The system in which the client PC list is displayed in accordance with a transmission of a packet of the notification information will be described in detail hereinafter.

The driver application module 500 of each of the client PCs 103 to 109 periodically transmits a packet at a predetermined interval until the user purposely stops the transmission. When receiving a notification information packet from the driver application module 500 of each of the client PCs 103 to 109, the MFP 102 reads content thereof and adds names of the client PCs 103 to 109 to a list to be displayed. The MFP 102 displays a name of a certain client PC in the list while the MFP 102 receives a notification information packet from the client PC, and if the notification information packet is not received for a predetermined period of time, the name of the client PC is automatically deleted.

In this embodiment, since the maximum number of client PCs the names of which can be displayed is five, even when another notification information packet is transmitted from a sixth client PC, the name of the sixth client PC onwards is not displayed in the list until one of the names of the client PCs currently displayed is deleted. For example, in a case where the names of the client PCs 103 to 107 are displayed, even if the client PCs 108 and 109 included in the network 101 continue transmission of notification information packets thereof, the names of the client PCs 108 and 109 are not displayed in the MFP 102.

Figure 14:
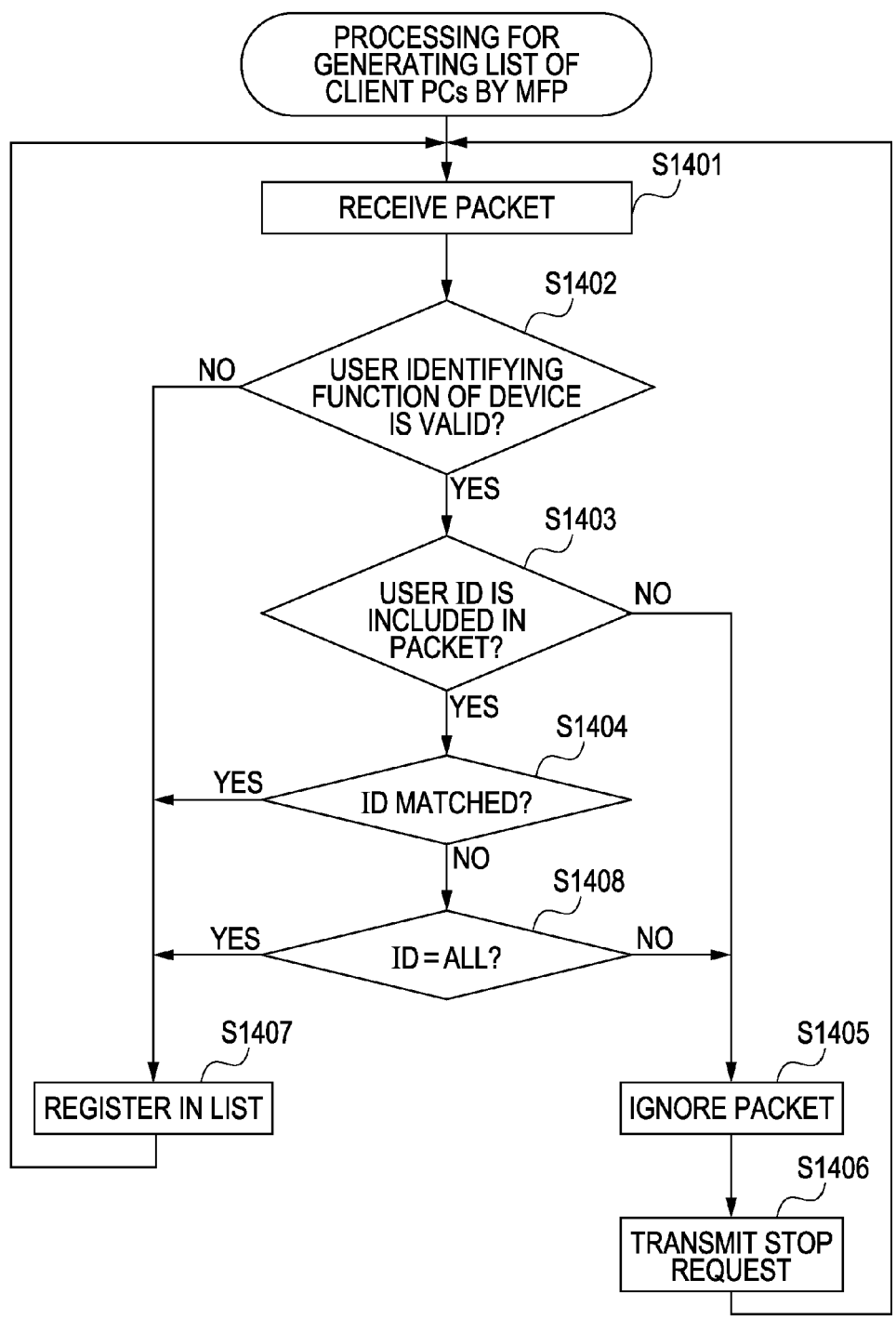
FIG. 14 is a flowchart illustrating processing performed by the MFP according to the embodiment of the present invention.

Next, a flow of processing for generating the client PC list performed by the MFP 102 of this embodiment will be described with reference to FIG. 14. Operations in steps shown in FIG. 14 are executed when the CPU 203 included in the MFP 102 controls function units in accordance with computer programs (the packet processing module 400 of the MFP 102 and the like shown in FIG. 4) stored in the ROM 205.

Figure 10:
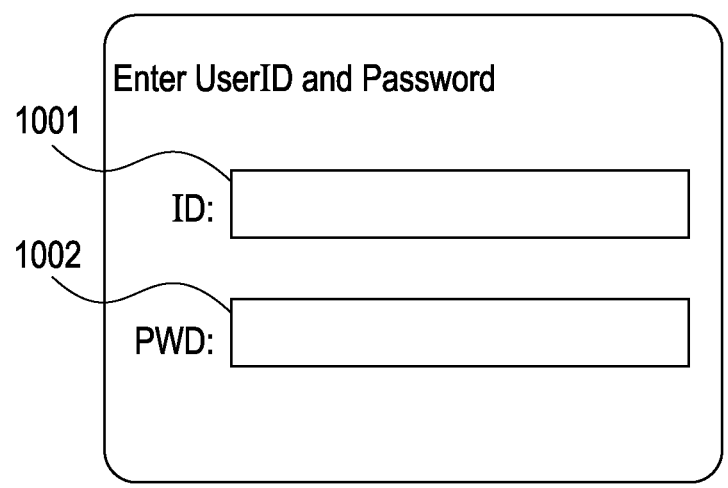
FIG. 10 is a diagram illustrating an example of a screen displayed in a display unit included in the MFP according to the embodiment of the present invention.

In step S1401, the MFP 102 receives a notification information packet transmitted from one of the client PCs 103 to 109. In step S1402, it is determined whether a user identification function of the MFP 102 is effective. The user identification function is a function of, when the user uses the MFP 102, prompting the user to input account information (an ID and a password) and performing authentication processing. When the authentication processing is successfully performed, login of the user is permitted, and otherwise, the login is refused. Accordingly, when it is determined that the user identification function of the MFP 102 is effective, only a specific user can use the MFP 102 whereas when it is determined that the user identification function of the MFP 102 is ineffective, an unspecified number of users can use the MFP 102. FIG. 10 is a diagram illustrating an example of a screen displayed in the LCD 901 included in the operating panel 207 of the MFP 102 when the user identification function is effective. The user who desires to use the MFP 102 is required to input a user ID and a password of a valid account in a user ID input field 1001 and a user password input field 1002, respectively, for authentication so as to use the MFP 102.

When it is determined that the user identification function is ineffective in step S1402, the process proceeds to step S1407, the MFP 102 registers the client PC in the client PC list in accordance with the received notification information packet. That is, the client PC is registered as a display object.

On the other hand, when it is determined that the user identification information is effective in step S1402, the process proceeds to step S1403. In step S1403, the reception packet information reading module 401 determines whether an ID is included in the received notification information packet. This ID has been specified in the ID input field 812 shown in FIG. 8 and included in the notification information packet in a format shown in FIG. 6. When the determination is negative in step S1403, the process proceeds to step S1405 where the reception packet information reading module 401 discards the received notification information packet. That is, in this case, the client PC is not registered in the client PC list. Then, in step S1406, the packet interruption request transmission module 403 transmits a request for interrupting a packet transmission to the client PC which has transmitted the notification information. When receiving the request, the client PC stops the transmission of the notification information packet performed by the packet transmission module 502 for a predetermined period of time.

When the determination is affirmative in step S1403, the process proceeds to step S1404 where the MFP 102 compares the ID included in the received notification information packet with the account information (the ID and the password) input by the user in the screen shown in FIG. 10. Since the storage unit such as the RAM 204 of the MFP 102 has stored the account information obtained through the input in the screen of FIG. 10 performed by the user, this information is used for the comparison of ID information. As a result of the comparison, when the IDs coincide with each other (or when the correlation between the IDs is recognized), the process proceeds to step S1407 where the MFP 102 registers the client PC to the client PC list in accordance with the received notification information packet. That is, the client PC is registered as a display object. On the other hand, when the IDs do not coincide with each other (or when the correlation between the IDs is not recognized) as the result of the comparison, the process proceeds to step S1408.

In step S1408, it is determined whether the ID included in the notification information packet is a share-specified ID. The share-specified ID means a state in which an ID "ALL" representing a "setting in which all users can use the MFP 102" is defined in the MFP 102 in advance, for example, and any client PC is registered in the client PC list irrespective of the account information of the user input in the screen shown in FIG. 10. Accordingly, even when the user identification function is effective in the MFP 102, a scanning setting which is desired by an unspecified number of users can be selected.

When the determination is affirmative in step S1408, the process proceeds to step S1407 where the MFP 102 registers the client PC in the client PC list in accordance with the received notification information packet. That is, this client PC is also registered as a display object. On the other hand, when the determination is negative in step S1408, the process proceeds to step S1405. Thereafter, the reception packet information reading module 401 discards the received notification information packet as described above. That is, the client PC is not registered in the client PC list in this case. Then, in step S1406, the packet interruption request transmission module 403 transmits a request for interrupting the packet transmission to the client PC which transmitted the notification information packet.

Note that the process in step S1408 (the process of checking the share-specified ID) may be omitted. In this case, when the IDs do not coincides with each other in step S1404, the process directly proceeds to step S1405.

As a result, since the MFP 102 repeatedly performs the processing described with reference to FIG. 14 as described above, only client PCs having a scanning setting to which an ID corresponding to the ID input to the MFP 102 by the user has been set are registered in the client PC list.

Next, a flow of processing for displaying the client PC list executed by the MFP 102 of this embodiment will be described with reference to FIG. 15. Operations in steps shown in FIG. 15 are executed when the CPU 203 included in the MFP 102 controls the function units in accordance with the computer programs (the packet processing module 400 of the MFP 102 and the like shown in FIG. 4) stored in the ROM 205.

Figure 11:
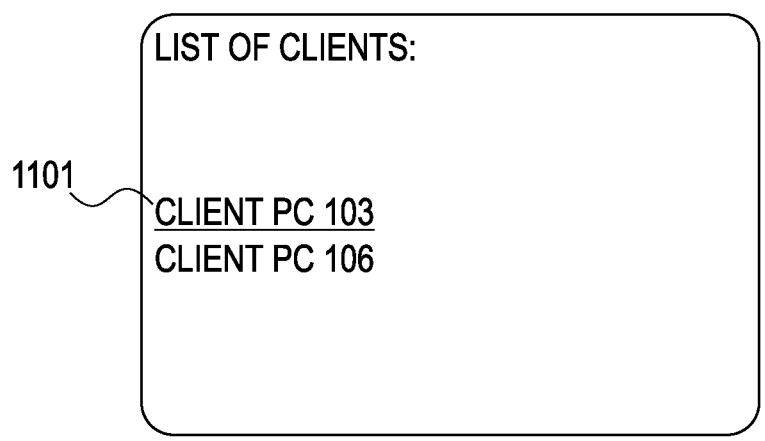
FIG. 11 is a diagram illustrating an example of a screen displayed in the display unit of the MFP according to the embodiment of the present invention.
Figure 15:
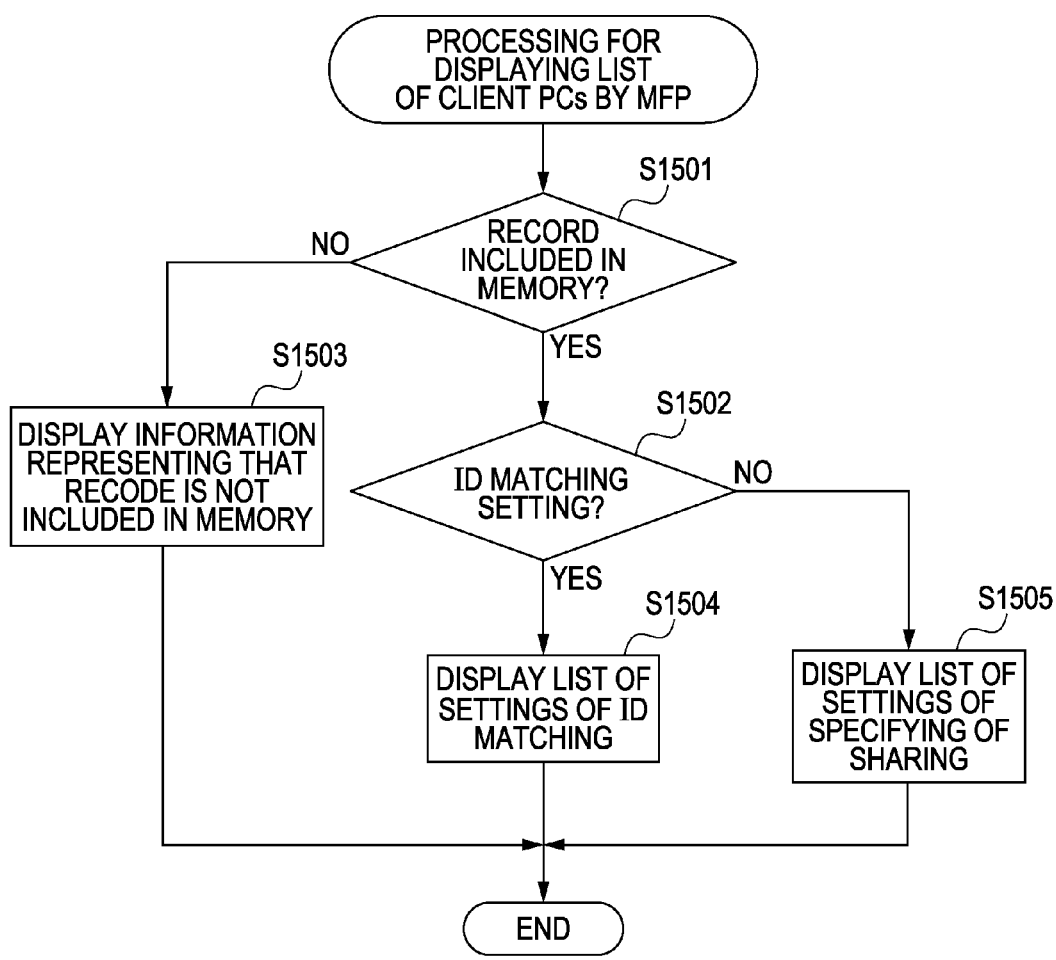
FIG. 15 is a flowchart illustrating processing performed by the MFP according to the embodiment of the present invention.

A flowchart shown in FIG. 15 is started when the user operates the operating panel 207 included in the MFP 102 so as to request for display of the client PC list. In step S1501, the MFP 102 determines whether the client PC list is stored in the storage unit using the display client PC information storage module 402. Note that the client PC list is generated in accordance with the flowchart shown in FIG. 14. When it is determined that the client PC list has been registered in step S1501, the process proceeds to step S1502. In step S1502, it is determined whether the client PC list stored in the storage unit includes a name of a client PC having an ID corresponding to (which coincides with) the ID input to the MFP 102 by the user at a time of login. That is, examples of the client PC which is registered in the client PC list in step S1407 of the flowchart of FIG. 14 include a client PC having an ID which coincides with the ID input to the MFP 102 by the user at the time of login and a client PC having a share-specified ID. In step S1502, it is determined whether the client PC having an ID which coincides with the ID input to the MFP 102 by the user at the time of login has been registered in the client PC list. When the determination is affirmative in step S1502, the process proceeds to step S1504 where a name of the client PC is displayed as a list in the LCD 901. FIG. 11 is a diagram illustrating an example of the client PC list displayed in the LCD 901 of the MFP 102. In this example, IDs set in the driver applications of the client PCs 103 and 106 coincide with the login ID of the MFP 102, and the client PCs 103 and 106 are registered (the processing shown in FIG. 14) in the client PC list and are displayed.

On the other hand, when the determination is negative in step S1502, the process proceeds to step S1505. In step S1505, among IDs of the client PCs stored in the storage unit using the display client PC information storage module 402, client PCs having the share-specified IDs (IDs corresponding to "ALL") are displayed in the LCD 901.

When it is determined that the client PC list has not been registered in step S1501, the process proceeds to step S1503. In step S1503, the MFP 102 displays information representing that no client PC is found. FIG. 13 is a diagram illustrating an example of a screen displayed in the LCD 901 of the MFP 102 in step S1503. The client PC list is not registered due to various reasons. Examples of the reason may include, in addition to a case where no effective client PC is found, a case where a packet reception fails due to network failure, for example. Therefore, in a case where a reception of a packet is not recognized for a certain period of time after the display processing is started, a comment suitable for an assumed cause should be appropriately displayed. For example, a comment which prompts the user to check network connection may be displayed.

As described above, only client PCs desired by the user can be displayed as a list by performing matching processing for matching the user ID with IDs included in notification information transmitted from the client PCs using the user identification function included in the MFP 102. Accordingly, usability is improved.

Note that, in FIG. 11, when the user selects one of the client PCs 103 and 106, a screen shown in FIG. 12 is displayed in the LCD 901. When the client PC 103, for example, is selected in the screen shown in FIG. 11 (as denoted by a reference numeral 1101 shown in FIG. 11), the screen is changed to a scanning setting selection screen which has been set in the driver application of the client PC 103 as shown in FIG. 12. FIG. 12 is a diagram illustrating an example of a screen displaying a list of scanning settings set in the driver application included in the client PC 103. In this screen, the button name input in the field 805 shown in FIG. 8 is displayed as identification information of a scanning setting. When the user selects one of the scanning settings and presses the start key 906, the MFP 102 performs scanning processing in accordance with the selected scanning setting.

Note that, although only client PCs having IDs which coincide with the ID input by the user and client PCs having the share-specified ID are determined as display objects, names of client PCs having IDs which do not coincide with the ID input by the user may be stored in another memory area. After the client PCs having IDs which coincide with the ID input by the user are preferentially registered using the display client PC information storage module 402, the client PCs which have IDs which do not coincide with the ID input by the user and the names of which have temporarily stored in another memory area may be registered in a remaining area until the upper limit is reached. In this case, if the names of the client PCs having IDs which do not coincide with the ID input by the user are displayed in gray color, the usability is improved.

Figure 16:
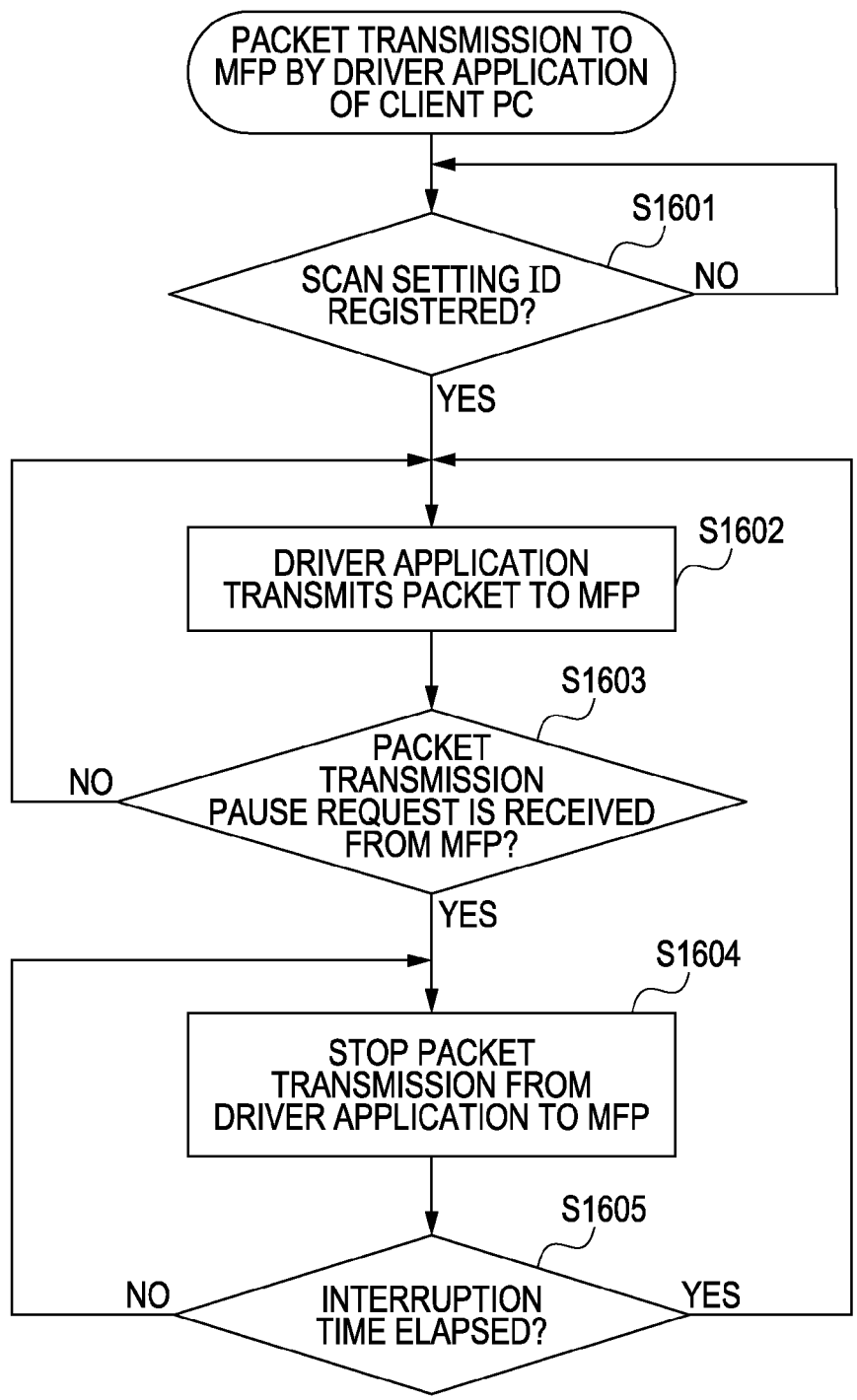
FIG. 16 is a flowchart illustrating processing performed by one of the client PCs according to the embodiment of the present invention.

Next, processing for transmitting the notification information from one of the client PCs 103 to 109 to the MFP 102 will be described with reference to a flowchart shown in FIG. 16. Operations in steps of FIG. 16 are executed when the CPU 302 included in the client PC controls the various function units in accordance with computer programs (driver application module 500 shown in FIG. 5 and the like) stored in the memory.

First, the driver application module 500 is activated in the client PC when the driver application module 500 is installed in the client PC, when the client PC is activated, when the user manually activates the client PC, or the like. When the driver application module 500 is activated, the client PC determines whether an ID has been registered in a scanning setting in step S1601. Specifically, the client PC determines whether an ID has been input in the ID inputting field 812 in the driver application setting screen shown in FIG. 8. When the determination is affirmative in step S1601, the process proceeds to step S1602 where a notification information packet is transmitted. On the other hand, until an ID is registered, a notification information packet is not transmitted (the process does not proceed to step S1602). Accordingly, since a notification information packet corresponding to an unregistered ID is not transmitted to the MFP 102, network traffic and load of the MFP 102 can be reduced.

In step S1602, the packet transmission module 502 included in the driver application module 500 transmits the notification information packet to the MFP 102. The MFP 102 serving as a destination of transmission of the notification information packet may be automatically detected when the driver application module 500 is installed or may be specified by the user. After the notification information packet is transmitted, it is determined whether the client PC has received a packet transmission interruption request from the MFP 102 in step S1603. When the determination is negative in step S1603, the process returns to step S1602 and the packet is again transmitted after a predetermined period of time. On the other hand, when the determination is affirmative in step S1603, the transmission of the notification information packet performed using the packet transmission module 502 is stopped in step S1604. After stopping the packet transmission, it is determined whether a certain period of time for interruption has been elapsed in step S1605. When the determination is affirmative in step S1605, the process returns to step S1602 and the transmission of the notification information packet is restarted. Note that the period of time for interruption is longer than the predetermined period of time measured when the determination is negative in step S1603.

Note that the operation of determining whether an ID is registered in the scanning setting in step S1601 may be omitted. In this case, however, a notification information packet which does not include an ID is transmitted to the MFP 102.

As described above, according to this embodiment, the client PC serving as a transmission source of the notification information packet including an ID corresponding to the ID input by the user is determined as a display object. Therefore, even when the number of client PCs which can be registered in the MFP 102 as transmission destinations of image data is limited, the user can reliably select a desired client PC using the MFP 102. This is because client PCs which have notification information packets to be transmitted including IDs which do not coincide with the ID input by the user are not displayed, and therefore, desired client PCs are likely to be included in a maximum number of client PCs. Furthermore, since only client PCs having IDs which coincide with the ID input by the user are determined as display objects, the user is prevented from selecting an improper client PC.

Second Embodiment

In the first embodiment, the MFP 102 which has received a packet supplied using the driver application module 500 performs the ID matching and determines whether display is performed. In a second embodiment, the ID matching is performed using a driver application module 500 and a determination as to whether a packet is to be transmitted is made using the driver application module 500.

When a user logs in a MFP 102 having a user identification function using a certain ID, the MFP 102 broadcasts a packet including ID information. A driver application module 500 which receives the packet compares ID information stored using a setting storage module 501 with the ID information included in the received packet. As a result of the comparison, when the IDs are not matched with each other, a packet transmission performed using a packet transmission module 502 is interrupted. Accordingly, the MFP 102 receives only notification information packets including ID information which matches the stored ID information. Consequently, the second embodiment also obtains the same advantage as the first embodiment.

Other Embodiments

In the foregoing embodiments, the MFP 102 is taken as an example of an image processing apparatus including a scanner device. However, the present invention is applicable to any image processing apparatus including a scanner device in addition to the MFP 102. Furthermore, although names of client PCs are displayed as a list as shown in FIG. 11 in the foregoing embodiments, the names may be successively displayed one by one.

In the foregoing embodiments, the ID included in the notification information packet is compared with the ID included in the account information required for the user identification function of the MFP 102. Furthermore, a configuration of the MFP 102 which does not include the user identification function and therefore which do not perform such a comparison is described above. However, the MFP which does not include the user identification function may be configured such that an ID input by the user is compared with the ID included in the notification information packet. In this case, even when the MFP does not include the user identification function, only names of client PCs desired by the user are displayed as a list, usability is improved.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-321634, filed Dec. 17, 2008, which is hereby incorporated by reference herein in its entirety.

What is claimed is:

1. An image processing apparatus comprising:
a reading unit configured to read an original document;
a receiving unit configured to receive specifying information used to specify a reading setting employed when the original document is read by the reading unit and user identification information assigned to the specifying information from an information processing apparatus;
an obtaining unit configured to obtain user identification information input by a user;
a determination unit configured to determine whether the user identification information received by the receiving unit corresponds to the user identification information obtained by the obtaining unit;
a registering unit configured to register, in a case that it is determined by the determination unit that the user identification information received by the receiving unit corresponds to the user identification information obtained by the obtaining unit, the information processing apparatus which transmitted the user identification information as a display object;
a displaying unit configured to display an identification of the information processing apparatus which is registered by the registering unit;
a selecting unit configured to select an information processing apparatus displayed by the displaying unit; and
a transmitting unit configured to transmit data generated when the reading unit reads the original document in accordance with the reading setting specified by the specifying information transmitted from the information processing apparatus selected by the selecting unit,
wherein in a case that the user identification information received by the receiving unit does not correspond to the user identification information obtained by the obtaining unit and the user identification information represents that specifying information is to be shared, the registering unit registers the information processing apparatus which transmitted the user identification information as a display object,
wherein the displaying unit is configured to display a plurality of identifications of a plurality of information processing apparatuses, including the identification of the information processing apparatus which transmitted user identification information corresponding to the user identification information obtained by the obtaining unit and the identification of the information processing apparatus which transmitted user identification information representing share of specifying information.

2. The image processing apparatus according to claim 1, further comprising:
an authentication unit configured to determine whether to allow the user to use the information processing apparatus in accordance with the user identification information received by the obtaining unit.

3. The image processing apparatus according to claim 1, wherein the displaying unit is configured to distinguish the plurality of identifications from each other when the plurality of information processing apparatuses which are registered by the registering unit are displayed.

4. The image processing apparatus according to claim 1, further comprising:
a requesting unit configured to request stop of a transmission of the user identification information to the information processing apparatus which transmitted the user identification information in a case that user identification information received by the receiving unit does not correspond to the user identification information obtained by the obtaining unit.

5. The image processing apparatus according to claim 1, wherein the displaying unit displays a list of names of a plurality of image processing apparatuses registered by the registering unit.

6. The image processing apparatus according to claim 1, wherein the user identification information is input by the user using the information processing apparatus which transmits the user identification information.

7. The image processing apparatus according to claim 1, wherein, in a case that it is determined by the determination unit that the user identification information received by the receiving unit does not correspond to the user identification information obtained by the obtaining unit, the information processing apparatus which transmitted the user identification information is not registered as a display object.

8. A method for controlling an image processing apparatus comprising steps of:
reading an original document;
receiving specifying information used to specify a reading setting employed when the original document is read by the reading step and user identification information assigned to the specifying information from an information processing apparatus;
obtaining user identification information input by a user;
determining whether the user identification information received by the receiving step corresponds to the user identification information obtained by the obtaining step;
registering, in a case that it is determined by the determining step that the user identification information received by the receiving step corresponds to the user identification information obtained by the obtaining step, the information processing apparatus which transmitted the user identification information as a display object;
displaying an identification of the information processing apparatus which is registered by the registering step;
selecting an information processing apparatus displayed by the displaying step; and
transmitting data generated when the reading step reads the original document in accordance with the reading setting specified by the specifying information transmitted from the information processing apparatus selected by the selecting step,
wherein in a case that the user identification information received by the receiving specifying information step does not correspond to the user identification information obtained by the obtaining user identification information step and the user identification information represents that specifying information is to be shared, the registering step registers the information processing apparatus which transmitted the user identification information as a display object,
wherein the displaying step is configured to display a plurality of identifications of a plurality of information processing apparatuses, including the identification of the information processing apparatus which transmitted user identification information corresponding to the user identification information obtained by the obtaining user identification information step and the identification of the information processing apparatus which transmitted user identification information representing share of specifying information.

9. A non-transitory computer-readable storage medium storing computer-executable instructions which when loaded into a computer and executed make an image processing apparatus execute steps of:
- reading an original document;
- receiving specifying information used to specify a reading setting employed when the original document is read by the reading step and user identification information assigned to the specifying information from an information processing apparatus;
- obtaining user identification information input by a user;
- determining whether the user identification information received by the receiving step corresponds to the user identification information obtained by the obtaining step;
- registering, in a case that it is determined by the determining step that the user identification information received by the receiving step corresponds to the user identification information obtained by the obtaining step, the information processing apparatus which transmitted the user identification information as a display object;
- displaying an identification of the information processing apparatus which is registered by the registering step;
- selecting an information processing apparatus displayed by the displaying step; and
- transmitting data generated when the reading step reads the original document in accordance with the reading setting specified by the specifying information transmitted from the information processing apparatus selected by the selecting step,
- wherein in a case that the user identification information received by the receiving specifying information step does not correspond to the user identification information obtained by the obtaining user identification information step and the user identification information represents that specifying information is to be shared, the registering step registers the information processing apparatus which transmitted the user identification information as a display object,
- wherein the displaying step is configured to display a plurality of identifications of a plurality of information processing apparatuses, including the identification of the information processing apparatus which transmitted user identification information corresponding to the user identification information obtained by the obtaining user identification information step and the identification of the information processing apparatus which transmitted user identification information representing share of specifying information.

10. An image processing apparatus comprising:
- a reading unit configured to read an original document;
- a receiving unit configured to receive setting information used to specify a reading setting employed when the original document is read by the reading unit and user identification information from an information processing apparatus;
- an authentication unit configured to determine, in accordance with user identification information input by a user, whether to allow the user to use the image processing apparatus;
- a determination unit configured to determine whether the user identification information received by the receiving unit corresponds to the user identification information input by the user for authentication by the authentication unit;
- a registering unit adapted to register, in a case that it is determined by the determination unit that the user identification information received by the receiving unit corresponds to the user identification information input by the user for authentication by the authentication unit, the information processing apparatus which transmitted the user identification apparatus as a display object, and not to register, in a case that it is determined by the determination unit that the user identification information received by the receiving unit does not correspond to the user identification information input by the user for authentication by the authentication unit, the information processing apparatus which transmitted the user identification apparatus as the display object;
- a display unit configured to display an identification of the information processing apparatus which is registered by the registering unit;
- a selecting unit configured to configured to select, from among information processing apparatuses displayed by the display unit, an information processing apparatus; and
- a transmitting unit configured to transmit, to the image processing apparatus selected by the selecting unit, data generated when the reading unit reads the original document in accordance with the setting information received from the image processing apparatus selected by the selecting unit.

11. The image processing apparatus according to claim 10, further comprising a requesting unit configured to request stop of a transmission of the user identification information to the information processing apparatus which transmitted the user identification information in a case that it is determined by the determination unit that the user identification information received by the receiving unit does not correspond to the user identification information input by the user for authentication by the authentication unit.

12. The image processing apparatus according to claim 10, wherein the display unit displays a list of names of each of a plurality of information processing apparatuses registered by the registering unit.

13. A method for controlling an image processing apparatus comprising steps of:
- reading an original document;
- receiving setting information used to specify a reading setting employed when the original document is read by the reading step and user identification information from an information processing apparatus;
- determining, by an authentification unit, in accordance with user identification information input by a user, whether to allow the user to use the image processing apparatus;
- determining, by a determination unit, whether the user identification information received by the receiving step corresponds to the user identification information input by the user for authentication by the authentication unit;
- registering, in a case that it is determined by the determination unit that the user identification information received by the receiving step corresponds to the user identification information input by the user for authentication by the authentication unit, the information processing apparatus which transmitted the user identification apparatus as a display object, and not to register, in a case that it is determined by the determination unit that the user identification information received by the receiving unit does not correspond to the user identification information input by the user for authentication by the authentication unit, the information processing apparatus which transmitted the user identification apparatus as the display object;

displaying an identification of the information processing apparatus which is registered by the registering step;

selecting, from among information processing apparatuses displayed by the display step, an information processing apparatus; and transmitting, to the image processing apparatus selected by the selecting step, data generated when the reading step reads the original document in accordance with the setting information received from the image processing apparatus selected by the selecting step.

14. A non-transitory computer-readable storage medium storing computer-executable instructions which when loaded into a computer and executed make an image processing apparatus execute steps of:

reading an original document;

receiving setting information used to specify a reading setting employed when the original document is read by the reading step and user identification information from an information processing apparatus;

determining, by an authentification unit, in accordance with user identification information input by a user, whether to allow the user to use the image processing apparatus;

determining, by a determination unit, whether the user identification information received by the receiving step corresponds to the user identification information input by the user for authentication by the authentication unit;

registering, in a case that it is determined by the determination unit that the user identification information received by the receiving step corresponds to the user identification information input by the user for authentication by the authentication unit, the information processing apparatus which transmitted the user identification apparatus as a display object, and not to register, in a case that it is determined by the determination unit that the user identification information received by the receiving unit does not correspond to the user identification information input by the user for authentication by the authentication unit, the information processing apparatus which transmitted the user identification apparatus as the display object;

displaying an identification of the information processing apparatus which is registered by the registering step;

selecting, from among information processing apparatuses displayed by the display step, an information processing apparatus; and transmitting, to the image processing apparatus selected by the selecting step, data generated when the reading step reads the original document in accordance with the setting information received from the image processing apparatus selected by the selecting step.

* * * * *